(12) United States Patent
LaRue et al.

(10) Patent No.: US 6,209,390 B1
(45) Date of Patent: Apr. 3, 2001

(54) TURBOCHARGER FATIGUE LIFE MONITOR

(76) Inventors: Gerald Duane LaRue, 2615 Plaza Del Amo #620, Torrance, CA (US) 90503; Donald Ervin Baker, 13882 Sherwood, Westminster, CA (US) 92683

( * ) Notice: Subject to any disclaimer, the term of this patent is extended or adjusted under 35 U.S.C. 154(b) by 0 days.

(21) Appl. No.: 09/312,380

(22) Filed: May 14, 1999

(51) Int. Cl.$^7$ .................................................. G01M 15/00
(52) U.S. Cl. ........................................ 73/119 R; 73/117.3
(58) Field of Search ........................... 73/112, 116, 117.2, 73/117.3, 118.1, 119 R

(56) References Cited

U.S. PATENT DOCUMENTS

| | | | |
|---|---|---|---|
| 4,046,003 | * 9/1977 | Armstrong et al. | 73/118.1 |
| 4,277,830 | * 7/1981 | Reid et al. | 73/116 |
| 4,334,427 | * 6/1982 | Armstrong | 73/118.1 |
| 4,356,725 | * 11/1982 | Armstrong | 73/118.1 |
| 4,499,733 | * 2/1985 | Farr et al. | |
| 4,604,701 | 8/1986 | Fujawa et al. | |
| 4,707,796 | 11/1987 | Calabro et al. | |
| 4,953,110 | 8/1990 | Chartrand | |
| 5,099,411 | 3/1992 | Blotenberg et al. | |
| 5,377,112 | * 12/1994 | Brown, Jr. et al. | 73/118.2 |
| 5,479,350 | 12/1995 | Barakchi et al. | |
| 5,546,795 | * 8/1996 | Yamagishi | 73/117.3 |
| 6,050,250 | * 4/2000 | Kerkau | |

\* cited by examiner

Primary Examiner—Eric S. McCall
(74) Attorney, Agent, or Firm—Grant T. Langton; Felix L. Fischer

(57) ABSTRACT

Turbocharger fatigue life monitors comprise at least one sensor that measures an actual operating condition of the turbocharger, e.g., turbine rotational speed or turbine inlet temperature. The device comprises a central processing unit for receiving information from each sensor and processing the information, using programs and predetermined turbocharger information, e.g., turbocharger material and stress data stored in one or more storage device in communication with the central processing unit, to provide an actual probability of turbocharger failure. The central processing unit compares the calculated probability of turbocharger failure to a predetermined specified probability of turbocharger failure stored in a storage device to determine whether turbocharger service is needed. The central processing unit provides a signal that operates an annunciator to indicate recommended or necessary turbocharger service when the actual probability of turbocharger failure exceeds the specified probability of turbocharger failure. The central processing unit and storage devices can be packaged independent of or as part of an existing turbocharged application system, e.g., an engine control module when the turbocharged application is a vehicle.

20 Claims, 1 Drawing Sheet

TURBOCHARGER FATIGUE LIFE MONITOR

FIELD OF THE INVENTION

This invention relates to turbochargers and devices/methods used to monitor turbocharger fatigue life and, more particularly, to devices/methods designed to monitor the fatigue life of a turbocharger based on the dynamic or actual operating parameters of a turbocharger, e.g., turbine wheel speed and temperature.

BACKGROUND OF THE INVENTION

Turbochargers are used in a variety of vehicle and stationary applications powered by gasoline and diesel internal combustion engines. The turbochargers that are used in each different dynamic or actual application are subjected to different turbocharger operating conditions, e.g., different operating speeds, temperatures, and duration. Additionally, turbochargers that are made for and used with a particular application, e.g., diesel-powered vehicles, may also be exposed to different turbocharger operating conditions depending on how the particular application is operated. Accordingly, turbochargers designed for use in a particular application such as a diesel-powered truck, can be subjected to a wide range operating conditions such as temperature, speed, and duration of use that will impact the service life of the turbocharger.

In an effort to reduce or minimize the probability of a turbocharger-related failure adversely impacting the operational efficiency of the particular application, it is desired that the turbocharger be removed for servicing or replacement prior to failing in service. Devices and methods known in the art for indicating such turbocharger service intervals include those that are designed to measure turbocharger service duration, i.e., hours or vehicle mileage. Such known devices provide an indication of whether turbocharger service is needed based on a preset duration. A disadvantage of such turbocharger service monitor devices is that they are designed to predict the turbocharger service interval for a particular turbocharger independent of the actual operating or performance conditions of that turbocharger. Additionally, the preset duration used to predict such service interval is intentionally selected to be conservative to minimize the possibility of in-service turbocharger failure. Thus, such known turbocharger service monitor devices can cause some turbochargers to be replaced or repaired before any such repair is actually required, are subjected to relatively mild operating conditions, and can cause some turbochargers to fail in service, if subjected to relatively extreme operating conditions. Underestimating the actual service life of a turbocharger is not desired because premature replacement of the turbochargers incurs both unnecessary expense and requires that the turbocharged application be prematurely removed from service. Overestimating the actual service life of a turbocharger is also not desired for the obvious reason of causing an in-service turbocharger failure, which both unpredictably removes the turbocharged application from service and could cause damage to other engine systems.

It is, therefore, desired that a turbocharger monitoring device/method be constructed that is capable of providing an indication of recommended or needed turbocharger based on the actual turbocharger operating conditions, thereby extending the service interval for turbochargers subjected to mild operating conditions and reducing the service interval for turbochargers subjected to extreme operating conditions to optimize turbocharger use.

SUMMARY OF THE INVENTION

Turbocharger fatigue life monitors, constructed according to principles of this invention, are designed to provide an indication of recommended/needed turbocharger service based on the actual operating conditions of the turbocharger that is being monitored, contrasted to other turbocharger monitors that provide an indication of turbocharged service based preset time or distance parameters without consideration of actual turbocharger operating conditions such as turbine speed, temperature and the like. Turbocharger fatigue life monitor devices incorporating the present invention includes at least one sensor that measures some actual operating condition of the turbocharger, e.g., turbine rotational speed or turbine inlet temperature. If it is necessary to monitor only the turbocharger compressor wheel, a speed sensor is used. If operational characteristics dictate, monitoring the turbocharger turbine wheel and/or the compressor wheel, both a speed sensor and a turbine inlet temperature sensor are used.

The device comprises means for receiving information from the sensors and processing the information, using programs and predetermined turbocharger information, e.g., turbocharger material and stress data stored in one or more storage means in communication with the processing means, to provide an actual probability of turbocharger failure. The processing means compares the calculated probability of turbocharger failure to a predetermined specified probability of turbocharger failure stored in the storage means to determine whether turbocharger service is needed. The processing means provides a signal that operates an annunciator to indicate recommended or necessary turbocharger service when the actual probability of turbocharger failure exceeds the specified probability of turbocharger failure. The processing and storage means can be packaged as part of an existing turbocharged application system, such as an engine control module when the turbocharged application is a vehicle.

DETAILED DESCRIPTION

Figure 1:
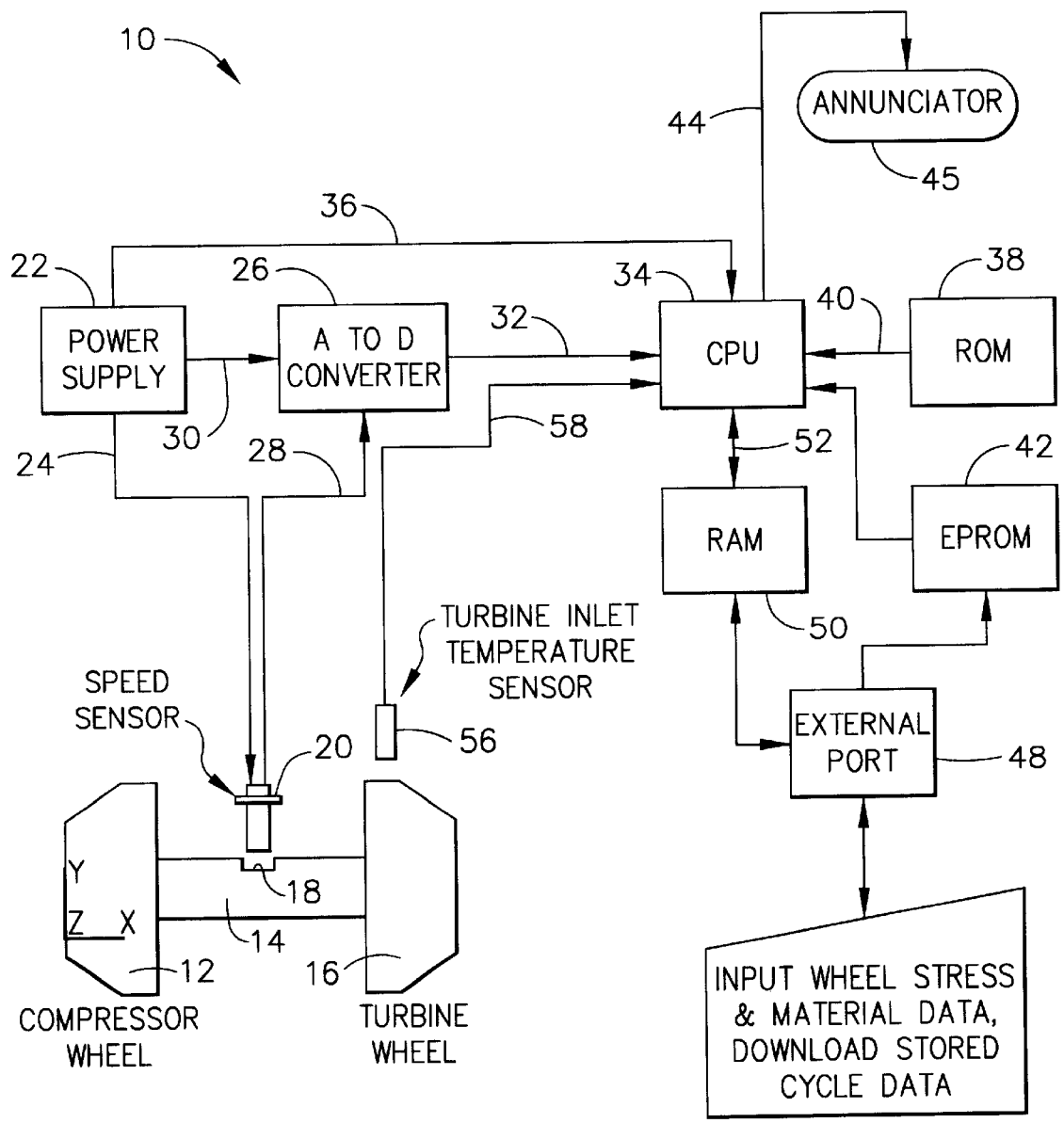
FIG. 1 is a schematic representation of a turbocharger and control system employing an embodiment of the invention.

Turbocharger fatigue life monitors of this invention are designed to provide an indication of needed turbocharger service based on the actual operating conditions of the turbocharger being monitored. In one embodiment of the invention, turbocharger service indication is based on monitoring the fatigue life of the turbocharger compressor wheel. In another embodiment of the invention, turbocharger service indication is based on monitoring the fatigue life of the turbocharger turbine wheel. In a still other embodiment of the invention, turbocharger service indication is based on monitoring the fatigue life of both the turbocharger compressor and turbine wheels. In each of these invention embodiments, turbocharger service indication is provided by processing actual turbocharger operating condition data, e.g., turbine shaft speed and/or turbine inlet temperature, according to a computer program using an on-board central processing unit.

FIG. 1 is a block diagram that illustrates each of the components of turbocharger fatigue life monitors 10 constructed according to principles of this invention. While FIG. 1 illustrates the components of a turbocharger monitor that is designed to measure both compressor and turbine wheel operating conditions, it is to be understood that FIG. 1 can also be used to illustrate other turbocharger monitor embodiments that measure either compressor or turbine wheel operating conditions. Accordingly, FIG. 1 will be referred to throughout this description for each of the invention embodiments.

Referring to FIG. 1, a first turbocharger monitor embodiment is engineered to provide an indication of needed turbocharger service based on the monitored fatigue life of a turbocharger compressor wheel 12 disposed within a turbocharger housing (not shown). A shaft 14 is common to both the compressor wheel 12 and a turbine wheel 16 and is mounted within the turbocharger housing. The shaft includes a flat section 18 that is positioned between bearing surfaces adjacent each shaft end. The flat section 18 is designed to permit measurement of shaft 14 rotational speed in the turbocharger. Because the shaft is attached to the compressor wheel 12 and turbine wheel 16, measurement of the shaft rotational speed also provides an indication of compressor and turbine wheel speed.

A speed sensor 20 is attached to the turbocharger so that it communicates with the shaft flat section 18. The speed sensor 20 can be of conventional design that operates using mechanical, magnetic or optical principles. In an example embodiment, the speed sensor is one that measures the rotational speed of the shaft by measuring the proximity of the sensor probe to the rotating flat and round sections of the shaft. The speed sensor 20 is powered by a power supply 22 that, depending on the particular turbocharger application, is configured to provide AC or DC electrical power thereto via suitable electrical connection 24. For example, when the turbocharger application is a vehicle, the power supply 22 can be in the form of a 12 volt DC battery. In the embodiment shown in the drawings, the speed sensor 20 provides an analog output signal that is routed to an analog to digital (AD) converter 26 via suitable electrical connection 28. The AD converter 26 can be of conventional design. For use with a mobile turbocharger application, e.g., a turbocharged vehicle, the AD converter 26 is positioned on-board the vehicle. The AD converter 26 is powered by a suitable electrical power source. In an example embodiment, the AD converter is powered by the same power supply 22 used to power the speed sensor via suitable electrical connection 30.

The AD converter 26 converts the analog output signal from the speed sensor 20 to a digital signal that is routed, via suitable electrical connection 32, to a processing means 34. In an example embodiment, the processing means is in the form of a central processing unit (CPU). The CPU is designed to receive the digital signal from the AD converter 26 for processing to evaluate compressor wheel fatigue in light of preprogrammed data. The CPU is powered by a suitable power source. In an example embodiment, the CPU is powered by the same power supply 22 that is used to power the speed sensor 20 and AD converter via suitable electrical connection 36. When used with a mobile turbocharger application, e.g., a turbocharged vehicle, the CPU is stored on-board the vehicle. In alternative embodiments, the speed sensor is a digital device directly providing a digital signal to the CPU.

If desired, other input signals can be routed to the CPU for monitoring and/or processing. In an example embodiment, where the fatigue monitor is used with a vehicle turbocharger application, the CPU can be configured to accept an input that provides engine speed or RPMs. It may be desirable to configure the CPU to accept such an additional input for possibly determining whether the turbocharger shaft is rotating when the engine is running for signaling a fault in the speed sensor or turbocharger itself that can be relayed to the operator.

The digital signal provided by the AD converter 26 is processed by the CPU 34 into a fatigue duty cycle using a suitable cycle counting algorithm, e.g., rainflow method, range-means pairs technique, and the like. In an example embodiment, the fatigue duty cycle is provided by the CPU using a rainflow counting algorithm stored in a first storage means 38. In an example embodiment, the first storage means is in the form of a read-only memory (ROM) chip. The CPU can be configured to continuously update the fatigue duty cycle using the continuous speed sensor input. Output from the ROM chip 38 is provided to the CPU 34 upon demand via suitable electrical connection 40, which can be in the form of electrical wire, solder connection, and the like.

A proprietary turbocharger life calculation program can be stored in a second storage means. However, in an example embodiment the second storage means is the same as the first storage means 38, i.e., the ROM chip. The turbocharger life calculation program stored on the ROM chip is accessed by the CPU for using with the fatigue duty cycle to calculate the actual probability of turbocharger compressor wheel failure.

A third storage means 42 is used to store such information as compressor wheel specific stress data and/or material data. In an example embodiment, the third storage means is in the form of an erasable programmable read only memory (EPROM) chip. The EPROM chip 42 also stores a preprogrammed specified probability of turbocharger compressor wheel failure that is used to determine whether the calculated actual probability of turbocharger compressor wheel failure exceeds the specified probability. In the event that the actual probability of failure exceeds the specified probability, the CPU 34 is designed to provide an output signal 44 to a suitable annunciator, e.g., audio and/or visual annunciator. The EPROM chip can be programmed with the above-identified information either during the chip manufacturing process or through an external port 48 before the fatigue life monitor device is shipped to a customer. The fatigue duty cycle information provided by the CPU 34 is routed to a random access memory (RAM) storage device 50 by suitable electrical connection 52 thereto. The stored fatigue duty cycle information is regularly accessed by the CPU and continuously updated for calculating the actual probability of turbocharger failure and comparing the same with the specified probability of failure. In alternative embodiments, the RAM storage device 50 is replaced with a flash memory or other non-volatile storage device and, like the EPROM chip, can also be programmed with particular data or information either during storage device manufacture or via the external port 48 after storage device manufacture or installation.

Data stored in the RAM storage device 50 can also be downloaded to a suitable device via the external port 48 for storage and/or further data treatment. This can occur when the particular turbocharged application is down for servicing and can be useful to track the performance history of the turbocharger in question. Such data can be extremely useful for better understanding actual turbocharger operating conditions for the purpose of engineering to meet specific application needs.

Configured in this manner, the first turbocharger fatigue life monitor embodiment is designed to: (1) measure compressor wheel speed; (2) provide a continuous fatigue life duty cycle; (3) provide a probability of turbocharger compressor wheel failure, based both on actual compressor wheel operating conditions (i.e., rotational speed) and specific compressor wheel stress and material data; (4) compare the actual probability of compressor wheel failure to a specified probability of failure; and (5) provide an indication of whether turbocharger service is necessary based on the comparison, i.e., whether the actual probability exceeds the specified probability.

Referring still to FIG. 1, a second turbocharger fatigue life monitor embodiment is engineered to provide an indication of needed turbocharger service based on the monitored fatigue life of a turbocharger turbine wheel 16 disposed within a turbocharger housing (not shown). In addition to those elements described above for the first embodiment monitor, the second monitor embodiment includes temperature sensor 56 that is attached to the turbocharger housing adjacent the turbine inlet to measure the gas temperature at the turbine inlet. An output signal from the temperature sensor is routed to the CPU 34 via suitable electrical connection 58 for processing by the CPU.

In the second monitor embodiment, the EPROM chip 42 is programmed to store both a fatigue life program specific to the turbocharger turbine wheel, incorporating temperature and fatigue duty cycle data, and turbine wheel stress and material data. In the second monitor embodiment, the CPU 34 is designed to process the turbine wheel speed, temperature, stress and material data to provide an actual turbocharger turbine wheel probability of failure that is compared to a specified turbine wheel probability of failure programmed into the EPROM chip 42. As described above for the first monitor embodiment, the CPU 34 is designed to provide an audio and/or video signal via an annunciator 45 when the actual probability of turbocharger turbine wheel failure exceeds the preprogrammed specified probability of failure.

Referring still again to FIG. 1, a third turbocharger fatigue life monitor embodiment is engineered to provide an indication of needed turbocharger service based on the monitored fatigue life of both a turbocharger compressor wheel 14 and turbine wheel 16 disposed within a turbocharger housing (not shown). The third embodiment monitor comprises the same elements described above for the second embodiment monitor, i.e., the monitor provides both shaft speed and turbine inlet temperature data. The EPROM chip 42 is programmed to store both a fatigue life program that is specific to both the turbocharger compressor and turbine wheels, incorporating speed, temperature and fatigue duty cycle data, and both compressor and turbine wheel stress and material data. In the second monitor embodiment, the CPU 34 is designed to process the speed, temperature, stress and material data to provide both an actual turbocharger turbine wheel probability of failure and a turbocharger compressor wheel probability of failure. The actual probabilities of failure are compared by the CPU to specified compressor wheel and turbine wheel probabilities of failure that are each programmed into the EPROM chip 42. As described above for the first and second monitor embodiments, the CPU 34 is designed to provide an audio and/or video signal via an annunciator 45 when either the actual probability of turbocharger failure exceeds its respective preprogrammed specified probability of failure.

Elements of turbocharger fatigue life monitors of this invention can packaged separately from other elements of the particular turbocharged application, or can be packaged as part of another turbocharger application element. For example, when the particular turbocharged application is a vehicle, one or more of the turbocharger fatigue life monitor elements can be packaged as part of an engine control module (ECM) that is used to monitor and/or control operating parameters of the vehicle engine. In exemplary embodiments, one or more of the elements of the fatigue life monitor, the CPU, ROM, EPROM, RAM and external port are packaged as part of the ECM to facilitate installation within the vehicle without using additional space or the functionality of one or more of the elements is incorporated integrally in the ECM.

Turbocharger fatigue life monitors of this invention that provide advantages over existing fatigue life monitors in that they provide an indication of needed turbocharger service based on the actual operating conditions of the turbocharger itself, rather than based only on preprogrammed time or distance intervals, i.e., criteria that are independent of actual turbocharger operating conditions. The use of turbocharger monitors of this invention enables turbocharger service intervals to be more accurately determined, thus minimizing the potential for turbocharger failures in extreme service conditions (that would have otherwise failed in service before any preprogrammed time or distance interval), and eliminating the unnecessary costs and inconveniences associated with the premature servicing of perfectly functional turbochargers in reduced service conditions (that would have otherwise been serviced according to a preprogrammed time or distance interval well before any such service was necessary).

Having now described the invention in detail as required by the patent statutes, those skilled in the art will recognize modifications and substitutions to the specific embodiments disclosed herein. Such modifications are within the scope and intent of the present invention.

What is claimed is:

1. A turbocharger fatigue life monitoring device comprising:
   a sensor for measuring rotational speed of a turbocharger shaft;
   processing means for receiving a rotational speed signal from the sensor, calculating a probability of turbocharger failure based on the rotational speed signal, and comparing the calculated probability of turbocharger failure to a predetermined specified probability of turbocharger failure, the processing means generating an output signal when the calculated probability of turbocharger failure exceeds the specified probability of turbocharger failure;
   indicating means responsive to the output signal from the processing means.

2. The device as recited in claim 1 further comprising a sensor for measuring temperature of a turbocharger turbine inlet, wherein the processing means additionally receives a temperature signal from the temperature sensor to calculate a probability of turbocharger failure.

3. The device as recited in claim 1 further comprising means for converting the rotational speed signal to a fatigue duty cycle that is accessed by the processing means.

4. The device as recited in claim 3 wherein the means for converting is stored in a read-only memory device.

5. The device as recited in claim 3 further comprising means for calculating the fatigue life of a turbocharger from the fatigue duty cycle that is accessed by the processing means.

6. The device as recited in claim 5 wherein the means for calculating is stored in a read-only memory device.

7. The device as recited in claim 5 further comprising means for storing predetermined turbocharger material and stress information for access by the processing means.

8. The device as recited in claim 7 wherein the means for storing is an erasable programmable read only memory device.

9. A turbocharger fatigue life monitor device comprising:
a sensor for measuring rotational speed of a turbocharger shaft;
at least one means for storing a counting program for converting rotational speed information to a fatigue life duty cycle, for storing predetermined turbocharger material and stress information, for storing a predetermined specified probability of turbocharger failure, and for storing a probability program that converts the fatigue life duty cycle and predetermined turbocharger information into a probability of turbocharger failure;
means for processing in communication with the sensor and the at least one storing means receiving rotational speed information from the sensor and the counting program, material and stress information and probability program in the at least one storing means to calculate a probability of turbocharger failure, and to compare the calculated probability of turbocharger failure to the predetermined specified probability of turbocharger failure;
means for indicating that the calculated probability of turbocharger failure exceeds the specified probability of turbocharger failure, the indicating means responsive to an output signal from the processing means.

10. The device as recited in claim 9 further comprising a sensor for measuring temperature of a turbine inlet, wherein the processing means is in communication with the temperature sensor and additionally processes a temperature signal from the temperature sensor to calculate a probability of turbocharger failure.

11. The device as recited in claim 9 wherein the counting program is stored in a read-only memory device.

12. The device as recited in claim 9 wherein the predetermined turbocharger material and stress information is stored in an erasable programmable read only memory device.

13. The device as recited in claim 9 wherein the specified probability of turbocharger failure is stored in an erasable programmable read only memory device.

14. The device as recited in claim 9 wherein the probability program converts the fatigue life duty cycle and predetermined turbocharger information into an is stored in a read-only memory device.

15. A method for determining a service interval for a turbocharger comprising the steps of:
measuring rotational speed of a turbocharger shaft;
converting the measured rotational speed into a fatigue duty cycle;
calculating a probability of turbocharger failure using the fatigue duty cycle and predetermined turbocharger material and stress information;
comparing the calculated probability of turbocharger failure to a predetermined specified probability of turbocharger failure; and
providing an indication that turbocharger service is recommended when the calculated probability of turbocharger failure exceeds the specified probability of turbocharger failure.

16. The method as recited in claim 15, further comprising the step of measuring gas temperature at a turbocharger turbine inlet, and the calculating step includes using the measured gas temperature to calculate the probability of turbocharger failure.

17. The method as recited in claim 15, wherein the steps of converting, calculating and comparing are performed by a central processing unit.

18. The method as recited in claim 17 wherein information used to process rotational speed information into the actual probability of turbocharger failure is stored in one or more storage devices in communication with the central processing unit.

19. The method as recited in claim 16 wherein the steps of converting, calculating and comparing is performed by a central processing unit.

20. The method as recited in claim 19 wherein information used to process rotational speed and temperature information into the probability of turbocharger failure is stored in one or more storage devices in communication with the central processing unit.

* * * * *